United States Patent [19]
Kamiya et al.

[11] Patent Number: 5,109,498
[45] Date of Patent: Apr. 28, 1992

[54] BUFFER MEMORY DEVICE CAPABLE OF MEMORIZING OPERAND AND INSTRUCTION DATA BLOCKS AT DIFFERENT BLOCK SIZES

[75] Inventors: Yasuaki Kamiya, Tokyo; Kenji Nishikubo, Yamanashi, both of Japan

[73] Assignee: NEC Corporation, Tokyo, Japan

[21] Appl. No.: 353,361

[22] Filed: May 17, 1989

[30] Foreign Application Priority Data

May 18, 1988 [JP] Japan .................. 63-119352

[51] Int. Cl.$^5$ .................. G06F 3/00; G06F 13/00; G11C 8/00
[52] U.S. Cl. .................. 395/425; 365/230.03; 365/189.05
[58] Field of Search .................. 364/200, 900; 365/230.03, 230.04, 49, 189.05

[56] References Cited

U.S. PATENT DOCUMENTS

| | | | |
|---|---|---|---|
| 4,312,036 | 1/1982 | Porter et al. | 364/200 |
| 4,575,814 | 3/1986 | Brooks, Jr. et al. | 364/900 |
| 4,908,748 | 3/1990 | Pathak et al. | 364/200 |

Primary Examiner—Alyssa H. Bowler
Attorney, Agent, or Firm—Foley & Lardner

[57] ABSTRACT

In a buffer memory device intermediate between a data processing unit and a main memory to memorize and read out an operand data block and an instruction data block in response to an operand request and an instruction request, respectively, the operand and the instruction data blocks have an operand block size and an instruction block size equal to N times the operand block size, respectively, where N is an integer greater than unity. The number N is preferably equal to $2^n$, where n is a natural number. The buffer memory device comprises a data buffer having a plurality of cache areas each of which has a predetermined area size equal to the operand block size. Thus, the operand data block occupies a single one of the cache areas while the instruction data block occupies a plurality of the cache areas, N in number. The operand data blocks coexist with the instruction data blocks in the data buffer at different block sizes. A data processor in the buffer memory device is selectively supplied with the operand and the instruction requests to produce an area address signal for accessing a single one and a plurality of the cache areas, respectively. The area address signal is sent to the buffer memory and a monitoring circuit for monitoring the buffer memory.

5 Claims, 4 Drawing Sheets

BUFFER MEMORY DEVICE CAPABLE OF MEMORIZING OPERAND AND INSTRUCTION DATA BLOCKS AT DIFFERENT BLOCK SIZES

BACKGROUND OF THE INVENTION

This invention relates to a buffer memory device for use in an information processing system comprising a cache memory between a data processing unit and a main memory.

In general, it is known in the art that a sequence of instruction data signals in a program tends to be continuously stored in consecutively numbered addresses of a main memory, which will be called a continuity of addresses for the instruction data signals while a sequence of operand data signals tends to be discontinuously dispersed or scattered in the main memory, which may be called a discontinuity of addresses for the operand data signals. Such instruction data signals and operand data signals are transferred from the main memory to a buffer memory device and stored in the cache memory at instruction data blocks and at operand data blocks.

A conventional buffer memory device of the type described comprises an instruction cache memory for memorizing the instruction data signals and an operand cache memory which is separated from the instruction cache memory and which memorizes the operand data signals. With this structure, it is possible to make each instruction block size of the instruction data blocks differ from each operand block size of the operand data blocks in consideration of the continuity and the discontinuity of the addresses for the instruction and the operand data signals, as mentioned above. This means that optimum block sizes can individually be selected for the instruction and the operand data blocks. Accordingly, the conventional buffer memory is effective to determine the instruction and the operand block sizes with reference to distribution of the addresses for the instruction and the operand data signals.

However, it is necessary to prepare both the instruction cache memory and the operand cache memory in the above-mentioned buffer memory device. Therefore, this buffer memory device is disadvantageous in that an amount of hardware essentially increases due to preparation of two cache memories.

Alternatively, a proposal has been offered about a buffer memory device comprising a common cache memory which memorizes both instruction data signals and operand data signals. In this structure, the common cache memory is loaded with both the instruction and the operand data signals at a common block size. In other words, no consideration is made about the continuity and the discontinuity of the addresses for the instruction and the operand data signals, respectively. Therefore, when the instruction and the operand data signals are memorized in the common cache memory at the common block size by neglecting the difference between the instruction and the operand block sizes, the common cache memory is not always effectively used for memorizing the instruction and the operand data signals.

SUMMARY OF THE INVENTION

It is an object of this invention to provide a buffer memory device which can reduce an amount of hardware in comparison with the case where two cache memories are used.

It is another object of this invention to provide a buffer memory device of the type described, which can effectively use a single cache memory.

A buffer memory device to which this invention is applicable is intermediate between a data processing unit and a main memory and is operable to selectively memorize and read out an operand data block and an instruction data block in response to an operand request and an instruction request issued from the data processing unit, respectively. The buffer memory device comprises a cache memory having a plurality of cache areas each of which has a predetermined area size. According to this invention, the operand data block has an operand block size of the predetermined area size while the instruction data block has an instruction block size equal to N times the operand block size where N is an integer greater than unity. The buffer memory device comprises producing means responsive to each of the operand and the instruction requests for producing an area address signal to access a single one and a plurality of the cache areas at the operand block size and at the instruction block size in response to the operand and the instruction requests, respectively. The area address signal is delivered to the cache memory. The buffer memory further comprises cache memory monitoring means coupled to the producing means and the cache memory for monitoring the cache memory with reference to the area address signal.

DESCRIPTION OF THE PREFERRED EMBODIMENT

Figure 1:
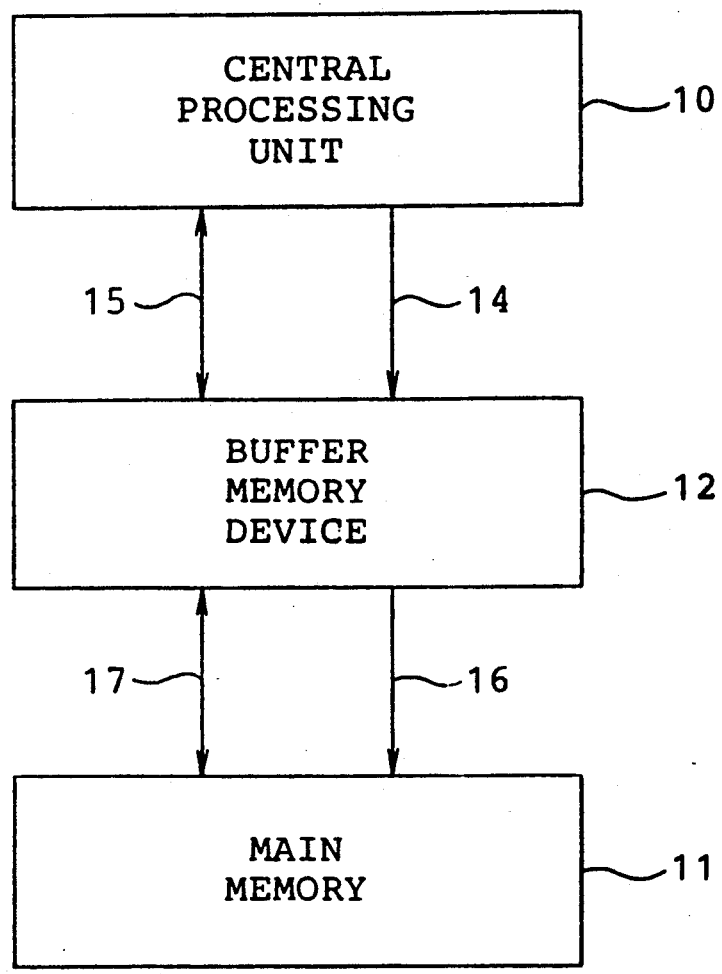
FIG. 1 is a block diagram of an information processing system which comprises a buffer memory device to which this invention is applicable.

Referring to FIG. 1, description will be made about a data processing system comprising a central processing unit (CPU) 10, a main memory 11, and a buffer memory device 12 to which this invention is applicable and which is intermediate between the central processing unit 10 and the main memory 11. The buffer memory device 12 is connected to the central processing unit 10 through a request line 14 and a reply line 15 on one hand and is connected to the main memory 11 through a main memory access line 16 and a block data line 17 on the other hand. Each line 14, 15, 16, and 17 is composed of a plurality of electrical conductors, although it is depicted at a single line in FIG. 1.

In the example being illustrated, the central processing unit 10 supplies either an operand request or an instruction request to the cache memory 12 through the request line 14. The operand request is produced either as an operand readout request or as an operand write-in request and is given to the buffer memory device 12 as an operand fetch request. Likewise, the instruction request may be produced either as an instruction readout request or an instruction write-in request is given to the buffer memory device 12 as an instruction fetch request. Each of the operand fetch request and the instruction fetch request comprises a request signal representative of whether a request in question is the operand fetch request or the instruction request and a memory address signal specifying a memory address of the main memory 11. In addition, each request also comprises a flag signal representative of either the readout request or the write-in request.

Supplied with such an operand fetch request or an instruction fetch request, the buffer memory device 12 supplies the central processing unit 10 with a reply which includes a reply signal indicative of presence or absence of a data signal required by each fetch request, if the required data signal is memorized in the buffer memory device 12. In this event, the required data signal is sent together with the reply signal through the reply line 15 to the central processing unit 10. On the other hand, if the required data signal is not memorized in the buffer memory device 12, the main memory 11 is accessed through the buffer memory device 12 and the main memory access line 16. Thereafter, data transfer is carried out from the main memory 11 to the buffer memory device 12 through the block data line 17 to transfer the required data signal through the block data line 17. The required data signal is thus held in the buffer memory device 12 on one hand and is transferred to the central processing unit 10 on the other hand.

Let the write-in request be issued as either the operand fetch request or the instruction fetch request through the request line 14 from the central processing unit 10 to the buffer memory device 12. The write-in request is specified by the request signal indicative of either the instruction or the operand fetch request, the flag signal representative of the write-in request, and the memory address signal together with a write-in data signal. The memory address is indicative of a write-in address. If the write-in data signal can be memorized in the buffer memory device 12, the write-in data signal is memorized in the buffer memory device 12. Otherwise, data transfer is carried out from the main memory 11 to the buffer memory device 12 through the block data line 17 to memorize a data block corresponding to the write-in address signal. In this event, the write-in data signal is also memorized in the main memory 11. Although the request line 14 is used in common to both the operand and the instruction fetch requests, different lines may be individually used for the operand and the instruction fetch requests.

On the other hand, let the readout request be issued from the central processing unit 10 through the request line 14 to the buffer memory device 12. The readout request is specified by the request signal, the flag signal representative of the readout request, and the memory address signal representative of a readout memory address. Responsive to such a readout request, the buffer memory device 12 reads a readout data signal out of the readout memory address, if the readout memory address is present in the buffer memory device 12. Otherwise, the readout data signal is read out of the main memory 11 to be sent through the buffer memory device 12 to the central processing unit 10. In this case, a data block which includes the readout data signal is transferred from the main memory 11 to the buffer memory device 12.

At any rate, the data transfer is carried out at every one of data blocks between the buffer memory device 12 and the main memory 11. In the illustrated example, the data blocks are individually determined for the operand data signal and the instruction data signal which have different block sizes, respectively. The block size for the instruction data signal will be called an instruction block size while the block size for the operand data signal will be called an operand block size. Herein, it is assumed that the instruction block size is equal to N times the operand block size where N is an integer greater than unity. Specifically, let N be equal to $2^n$ where n is a natural number. Usually, n may be, for example, two and the instruction block size is therefore equal to four times the operand block size.

Figure 2:
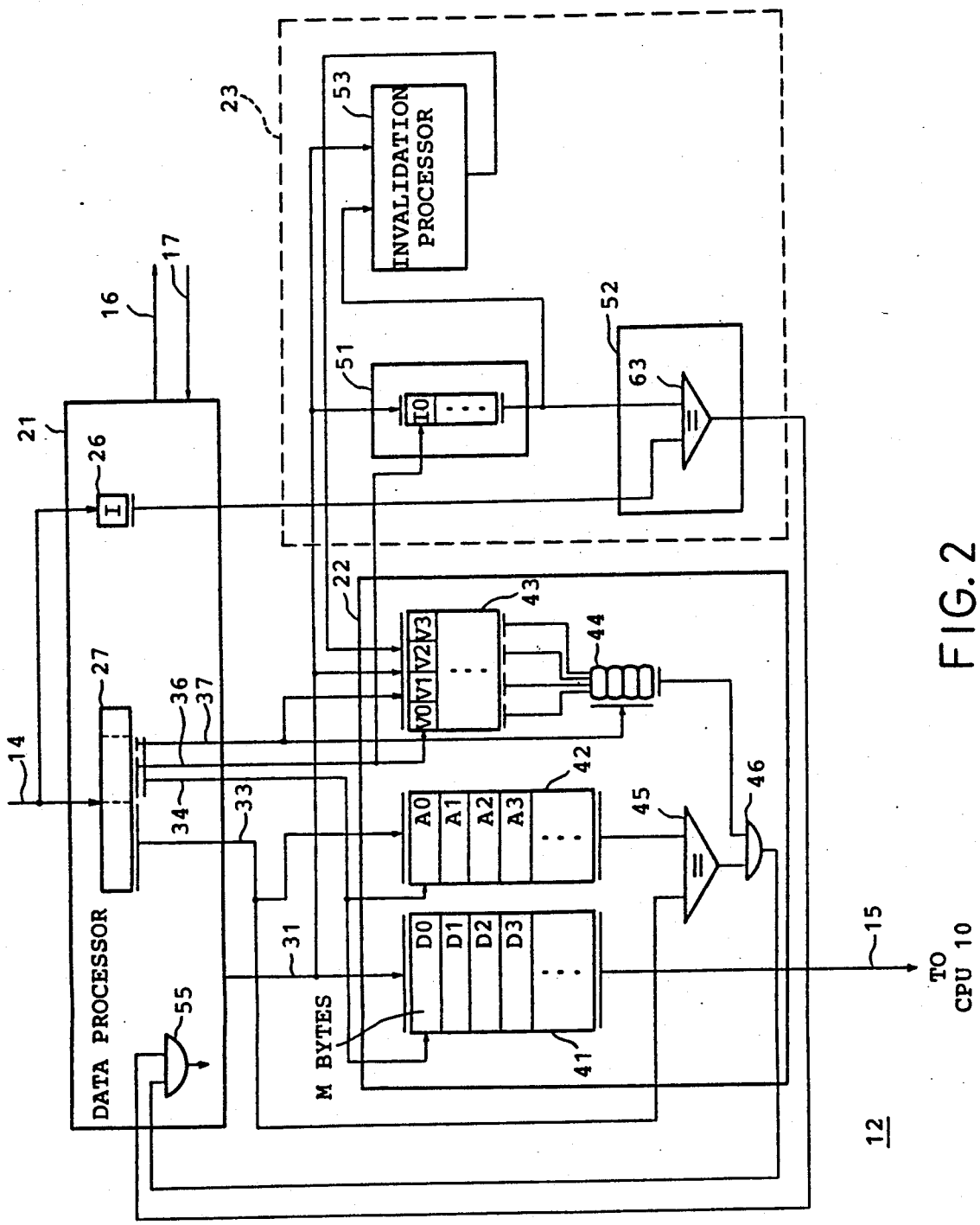
FIG. 2 is a block diagram of a buffer memory device according to a preferred embodiment of this invention.

Referring to FIG. 2 together with FIG. 1, a buffer memory device 12 according to a preferred embodiment of this invention comprises a data processor 21, a cache memory 22, and a monitoring circuit 23. More particularly, the data processor 21 is connected to the central processing unit 10 through the request line 14 and to the main memory 11 through the main memory address line 16 and the block data line 17. In this connection, the illustrated data processor 21 is supplied with either the operand fetch request or the instruction fetch request from the central processing unit 10 through the request line 14. Each of the operand and the instruction fetch requests includes the request signal, the address signal, and the flag signal, as mentioned before. The address signal specifies a required address of the main memory 11. The request signal is representative of either the operand fetch request or the instruction fetch request and is held in a first register 26. The request signal serves to practically indicate either the operand block size or the instruction block size and may be therefore recognized in the buffer memory device 12 as a block information signal which is indicative of each block size of the operand and the instruction data signals. The request signal or block information signal takes a logic "0" level and a logic "1" level in the operand and the instruction fetch requests, respectively.

On the other hand, the flag signal is not directly concerned with this invention and will not be described any longer. Moreover, either the operand or the instruction data signals is included in the operand or the instruction fetch request when each fetch request is the write-in request, although the following description will mainly be restricted to the readout request. The operand and the instruction data signals are delivered from the central processing unit 10 (FIG. 1) to the cache memory 22 through the data processor 21 and a data registration line 31 when the write-in request is given to the data processor 21.

The address signal is held in a second or address register 27 of the data processor 21 and is divisible into a first significant part of higher significant bits, a second significant part of significant bits lower than those of the first significant part, and a remaining part. The illustrated second significant part is subdivided into higher and lower local significant parts. The lower local significant part is composed of two bits in the illustrated example. The first and the second significant parts are delivered to the cache memory 22 through first and second internal address lines 33 and 34, respectively. Likewise, the higher and the lower local significant parts are sent to the cache memory 22 through third and fourth internal address lines 36 and 37, respectively. The higher local significant part may be called an instruction set address for each instruction data block, as will become clear as the description proceeds.

The cache memory 22 comprises a data buffer 41 having an address space specifiable by the second significant part of the address signal kept in the second register 27. In addition, the data buffer 41 has a plurality of cache areas the number of which may be determined by a bit number of the second significant part of the address signal, namely, the address space and each of which has a memory capacity M of, for example, 128 bytes. The cache areas are consecutively numbered from a zeroth cache area D0 to a last cache area. The data buffer 41 is supplied with either the operand or the instruction data signal through the data registration line 31 and is also supplied from the second register 27 with the second significant part through the first internal address line 33. As a result, either the operand data signal or the instruction data signal is memorized in the buffer memory 41 in response to the readout request in a manner to be described later.

An address buffer 42 is included in the cache memory 22 and is connected to the second register 27 through the first and the second internal address lines 33 and 34. The illustrated address buffer 27 has a plurality of address buffer areas which are equal in number to the cache areas and which are accessible by the second significant part of the address signal. The address buffer areas are consecutively numbered from a zeroth address buffer area A0 to a last address buffer area in one-to-one correspondence to the cache areas. The address buffer areas are loaded with first significant parts in the respective address buffer areas indicated by second significant parts of address signals previously given through the second register 27, in response to previous requests, issued from the central processing unit 10.

In addition, the cache memory 22 further comprises a validity information signal buffer 43 for memorizing a validity information signal V in every one of validity buffer addresses in a manner to be mentioned later. The validity information signal buffer 43 is connected to the second register 27 through the third and the fourth internal address lines 36 and 37 to be accessed by the higher and the lower local significant parts of the address signal and to produce four bits of the validity information signals in parallel. The four bits of the validity information signals are sent to a selector 44 supplied with the lower local significant part of the address signal from the second register 27.

Furthermore, the cache memory 22 comprises a comparator 45 connected to the second register 27 through the first internal address line 33 and to the address buffer 42 and an AND gate 46 connected to the comparator 45 and the selector 44.

In FIG. 1, the monitoring circuit 23 is operable in cooperation with the data processor 21 to monitor the cache memory 22. The illustrated monitoring circuit 23 comprises a block information circuit 51 connected to the data processor 21 through the third internal address line 36 and the data registration line 31, a comparator circuit 52 connected to the block information circuit 51 and the first register 26, and an invalidation processor 53 connected to the data processor 21, the block information circuit 51, and the validity information signal buffer 43. All of the block information circuit 51, the comparator circuit 52, and the invalidation processor 53 will be described more in detail.

The comparator circuit 52 is connected together with the AND gate 46 to an AND gate circuit 55 included in the data processor 21.

As known in the art, data transfer is carried out between the main memory 11 (FIG. 1) and the illustrated buffer memory device 12 through the block data line 17 at every operand data block or every instruction data block, if necessary. In this event, either the operand data block or the instruction data block is transferred on the block data transfer.

In the example being illustrated, it is to be recollected that the instruction block size of the instruction data block is equal to N times, for example, four times the operand block size, as mentioned in conjunction with FIG. 1. Moreover, each of the cache areas of the data buffer 41 can be loaded with a single one of the operand data blocks. In this connection, each of the instruction data blocks is memorized in a plurality of the cache areas of the data buffer 41, for example, four of the cache areas. Taking this into consideration, the illustrated buffer memory device 12 selectively carries out an operation in response to the operand fetch request and the instruction fetch request. In this event, it is to be noted that the operand and the instruction fetch requests are dealt with in the buffer memory device 12 in different manners to be presently described.

Herein, a required operand data block is assumed to be transferred from the main memory 11 to the buffer memory device 12 in response to a required one of the operand fetch requests. Such data transfer is carried out as a result of absence of the required operand data block in the cache memory 22.

In this event, the first register 26 is loaded with the block information signal of the logic "0" level representative of the operand fetch request while the second register 27 is loaded with a required operand address which is divisible into the first significant part, the second significant part, and the remaining part, as mentioned above, and in which a required operand data signal is memorized. The first and the second significant parts of the required operand address are delivered to the main memory 11 through the main memory access line 16 to read the required operand data block out of the main memory 11. The required operand data block which includes the required operand data signal is sent to the data buffer 41 through the block data line 17, the data processor 21, and the data registration line 31.

Inasmuch as the data buffer 41 is given the second significant part of the required operand address from the second register 27 through the second internal address line 34, the required operand data block is memorized in one of the cache areas that is specified by the second significant part of the required operand address.

On the other hand, the address buffer 42 is loaded with the first significant part of the required operand address in response to the second significant part thereof. Simultaneously, a validity information signal is accompanied by the required operand data block and is stored in the validity information signal buffer 43 in accordance with the second significant part of the required operand address while a block information signal of the logic "0" level is also accompanied by the required operand data block and is stored in the block information storage 60 in accordance with the higher local significant part.

In the meanwhile, let a required instruction data block be transferred from the main memory 11 to the buffer memory device 12 in response to a required instruction fetch request as a result of absence of the required instruction data block in the cache memory 22.

In this case, the first register 26 is loaded with the logic "1" level while the second register 27 is loaded with a required instruction address which is also divisible into the first and the second significant parts and the remaining part. A required instruction data signal is assumed to be stored in the required instruction address.

On transfer of the required instruction data block, the data processor 21 is supplied with the required instruction data block from the main memory 11. To this end, the main memory 11 is accessed to read the required instruction data block out of four main memory areas corresponding to the cache areas. Such a readout operation can be carried out by the use of a known technique. At any rate, the required instruction data block is successively written into four consecutive cache areas in accordance with that second significant part of the required instruction address which indicates a leading one of the cache areas for memorizing the required instruction data block. Concurrently, the address buffer 42 is loaded with the first significant part of the required instruction address in four consecutive address areas which are in one-to-one correspondence to the four consecutive cache areas. Likewise, the validity information signals of the logic "1" levels are accompanied by the required data block and are memorized in four columns of a row of the validity information signal buffer 43 with reference to the higher and the lower significant parts of the required instruction address. In addition, the block information signal of the logic "1" level is stored in the block information storage 60.

Figure 3:
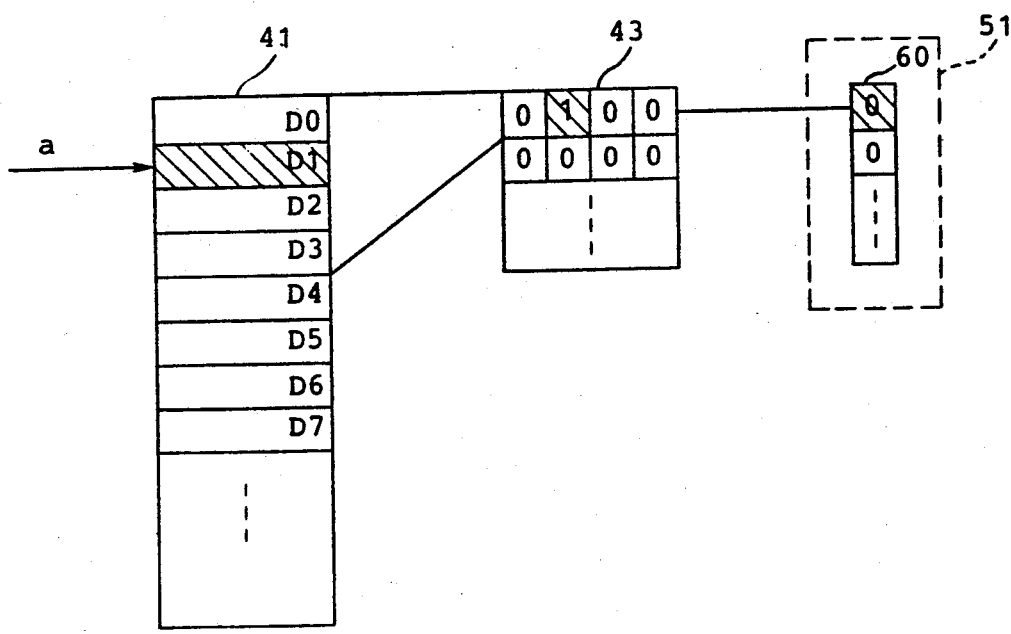
FIG. 3 shows a partial block diagram for use in describing an operation in the buffer memory device illustrated in FIG. 2.

Referring to FIG. 3 in addition to FIG. 2, it is surmised that the first cache area D1 of the data buffer 41 is loaded with one of the operand data blocks as a memorized operand data block of the M bytes, as depicted at a hatched portion in the data buffer 41 of FIG. 3. As mentioned before, the validity information signal buffer 43 has the validity buffer addresses which are in one-to-one correspondence to the respective cache areas to memorize the validity information signals of single bits. In FIG. 3, four bits of the validity information signals are arranged in each row. Four bits of an uppermost or zeroth one of the rows are made to correspond to the zeroth through the third cache areas D0 to D3, respectively. Likewise, four bits of the following row are made to correspond to the fourth through the seventh cache areas D4 to D7, respectively. In this connection, a second column of the zeroth row in the validity buffer addresses of the validity information signal buffer 43 is loaded with the validity information signal of the logic "1" level representative of validity of the one of the operand data blocks memorized in the first cache area D1, as shown by a hatched portion in the validity information signal buffer 43. In the remaining validity buffer addresses, the logic "0" levels are memorized to indicate absence of valid data blocks in the corresponding cache areas.

Such a validity information signal is sent from the data processor 21 through the data registration line 31 (FIG. 1) to the validity information signal buffer 43 accessed by the higher local significant part through the third internal address line 36. In this case, a single row of the validity information signal buffer 43 is simultaneously accessed by the higher local significant part. This shows that a single one of the validity buffer addresses in each row is not specified by the higher local significant part of the address signal. In order to specify the single validity buffer addresses in each row in a known manner, an enable signal (not shown) is also given from the data processor 21 or the lower significant part may be given to the validity information signal buffer 43.

In FIG. 3, the block information circuit 51 is specified by a block information storage 60 having a plurality of storage addresses which may be equal in number to the rows of the validity information signal buffer 43. In each storage address of the block information storage 60, a block information signal is stored so as to specify whether each row of the validity information signal buffer 43 is loaded with the operand data block or the instruction data block. In the example being illustrated, the logic "0" level is stored in an uppermost or zeroth one of the storage addresses when at least one of the operand data blocks is memorized in the row of the validity information signal buffer 43. On the other hand, the logic "1" level is stored in each storage address when the instruction data block is memorized in each row of the validity information signal buffer 43. As mentioned above, the logic "0" level is stored in each storage address of the block information storage 60 even when one of the operand data blocks is memorized in the row. This means that the logic "0" level of each storage address is kept unchanged when four operand data blocks are memorized in the cache areas corresponding to each row of the validity information signal buffer 43.

Such a block information signal can be stored in each storage address of the block information storage 60 by supplying the block information storage 60 with the higher local significant part and the block information signal which is included in each of the operand and the instruction fetch requests and which is sent from the data processor 21 through the data registration line 31. Alternatively, the block information signal may be delivered from the first register 26 to the block information storage 60.

In any event, an uppermost or zeroth one of the storage addresses in the block information storage 60 is loaded with the logic "0" level to indicate storage of the operand data block, as illustrated in FIG. 3. Thus, the data buffer 41, the validity information signal buffer 43, and the block information storage 60 are put into the illustrated states.

Under the circumstances, the operand fetch request is assumed to be the readout request and to be issued as a required operand request from the central processing unit 10 (FIG. 1) to the data processor 21 (FIG. 2). As a result, the first significant part of a required address signal is sent as an operand access signal (depicted at a in FIG. 3) from the second register 27 to the data buffer 41 to access the first cache area D1 of the data buffer 41. In this event, the higher local significant part of the address signal is delivered from the second register 27 to the validity information signal buffer 43 through the third internal address line 36 to specify the uppermost or zeroth row of the validity information signal buffer 43. Consequently, the validity information signals are concurrently read out of the zeroth row of the validity information signal buffer 43 to be sent to the selector 44 which is supplied with the lower local significant part of two bits. Supplied with the four bits of the validity information signals read out of the validity information signal buffer 43, the selector 44 (FIG. 1) selects the validity information signal of the logic "1" level as a selected validity information signal in response to the lower local significant part in the example being illustrated. The selected validity information signal of the logic "1" level is sent to the AND gate 46.

On the other hand, the address buffer areas of the address buffer 42 are loaded with those first significant parts of the address signals which correspond to the operand and the instruction data blocks memorized in the data buffer 41 and which may be referred to as first memorized parts. Responsive to the second significant part which specifies the first address buffer area and which is sent from the second register 27, the address buffer 42 produces the first memorized part memorized in the first address buffer area. The first memorized part is delivered from the address buffer 42 to the comparator 45 supplied with the first significant part sent from the second register 27. The comparator 45 compares the first memorized part with the first significant part held in the second register 27 to produce an address coincidence signal of the logic "1" level when the first memorized part is coincident with the first significant part.

Responsive to the address coincidence signal and the selected validity information signal, the AND gate 46 delivers a gate output signal of the logic "1" level to the AND gate circuit 55 of the data processor 21 (FIG. 1). The gate output signal of the logic "1" level is indicative of presence of a requested data block in the cache memory 22 and may be called a bit signal. On the other hand, the gate output signal of the logic "0" level is indicative of absence of a requested data block and may be called a mishit signal.

In FIG. 3, the block information storage 60 is accessed by the higher local significant part of the address signal held in the second register 27. In this case, the block information signal of the logic "0" level is read out of the zeroth one of the storage areas of the block information storage 60 as a specific block information signal to indicate storage of the operand data block, as shown in FIG. 3. The specific block information signal is delivered from the block information storage 60 to the invalidation processor 53 on one hand and to the comparator circuit 52 on the other hand.

Operation of the invalidation processor 53 will be described later in detail. The comparator circuit 52 comprises a comparator unit 63 connected to the block information storage 60 and the first register 26 of the data processor 21, as shown in FIG. 1. The comparator unit 63 is therefore supplied with the block information signal and the specific block information signal from the first register 26 and the block information storage 60, respectively. When the block information signal is coincident with the specific block information signal read out of the block information storage 60, the comparator unit 63 supplies the AND gate circuit 55 with a block coincident signal of the logic "1" level indicative of coincidence between the requested block information signal and the specific block information signal. Otherwise, an incoincident signal of the logic "0" level is sent from the comparator unit 63 to the AND gate circuit 55.

When the gate output signal of the logic "1" level and the block coincident signal are sent from the AND gate 46 and the comparator unit 63, the AND gate circuit 55 supplies the central processing unit 10 (FIG. 1) as the reply signal with a logic "1" level signal indicative of presence of a required operand data block in the cache memory 22. In this event, the required operand data block is read out of the first cache address of the data buffer 41 and is transferred through the reply line 15 to the central processing unit 10.

Figure 4:
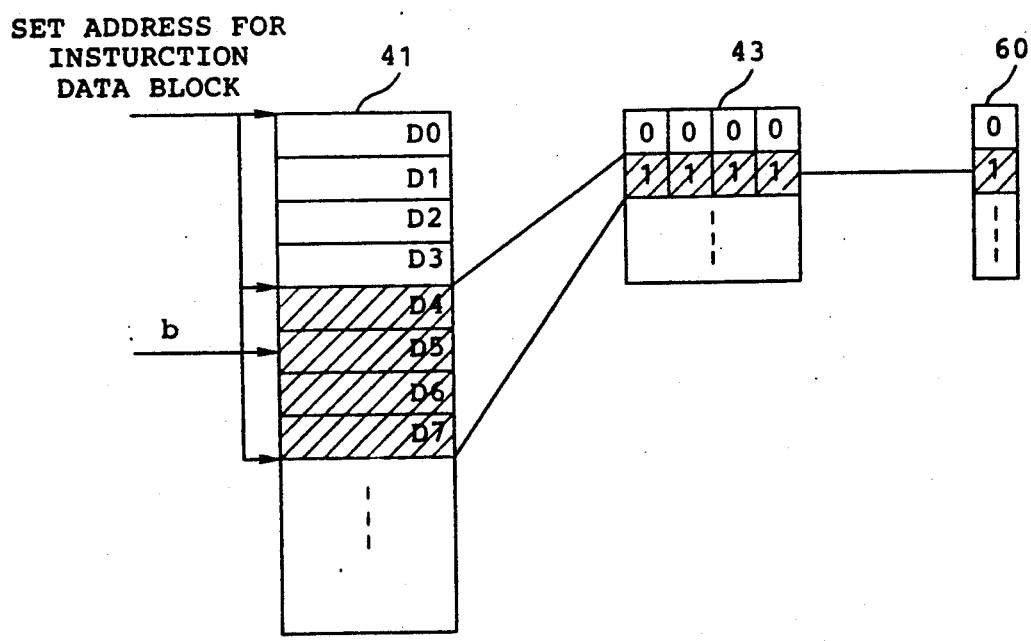
FIG. 4 shows a similar block diagram for use in describing another operation in the buffer memory device illustrated in FIG. 3.

Referring to FIG. 4 together with FIG. 1, it is assumed that the fourth through seventh cache areas D4 to D7 of the data buffer 41 are loaded with an instruction data block, as indicated by a hatched portion, and that four columns of the first row in the validity information buffer 43 are loaded with the validity information signals of the logic "1" levels, respectively. This is because the instruction block size occupies four cache areas of the data buffer 41, as mentioned before. In addition, the first one of the storage addresses in the block information storage 60 is loaded as the block information signal with the logic "1" level so as to specify storage of the instruction data block in the fourth through the seventh cache areas of the data buffer 41.

Under the circumstances, let the instruction fetch request be the readout request and issued as a required instruction request from the central processing unit 10 to the buffer memory device 12 (FIG. 2). In this event, the second significant part of a required address signal included in the required instruction request is sent from the second register 27 to the data buffer 41 and the address buffer 42. The first significant part is delivered from the address register 27 to the comparator circuit 45. Furthermore, the higher and the lower local significant parts of the required address signal are sent from the address register 27 to the validity information signal buffer 43 and the selector 44, as mentioned in conjunction with FIG. 3.

Consequently, a first significant part is read as a first memorized part out of the first address area A1 of the address buffer 42 to be sent to the comparator circuit 45 and is compared with the first significant part of the required address signal. In addition, the validity information signals of the logic "1" levels are read out of the first row of the validity information signal buffer 43 to be sent to the selector 44. The selector 44 selects one of the validity information signals that is delivered to the AND gate 46. When the comparator 45 detects the coincidence between the first memorized part and the first significant part of the required address signal with the validity information signal of the logic "1" level given from the selector 44 to the AND gate 46, the gate output signal of the logic "1" level is supplied as the hit signal from the AND gate 46 to the AND gate circuit 55.

On the other hand, the first one of the storage addresses in the block information storage 60 is loaded with the block information signal of the logic "1" level to specify storage of the instruction data block, as shown in FIG. 4. Inasmuch as the first register 26 is loaded with the logic "1" level to specify the instruction fetch request in the example being illustrated, the comparator circuit 63 supplies the AND gate circuit 55 with the logic "1" level. Therefore, the data processor 21 gives the central processing unit 10 the reply signal of the logic "1" level representative of presence of the instruction data block in question. In addition, the data buffer 41 is given the second significant part of the address signal as an instruction access signal (depicted at b in FIG. 4). Accordingly, the instruction data signal in question is read out of the first cache area A1 of the data buffer 41 to be sent to the central processing unit 10. Alternatively, the instruction data block may be transferred from the data buffer 41 to the central processing unit 10.

Figure 5:
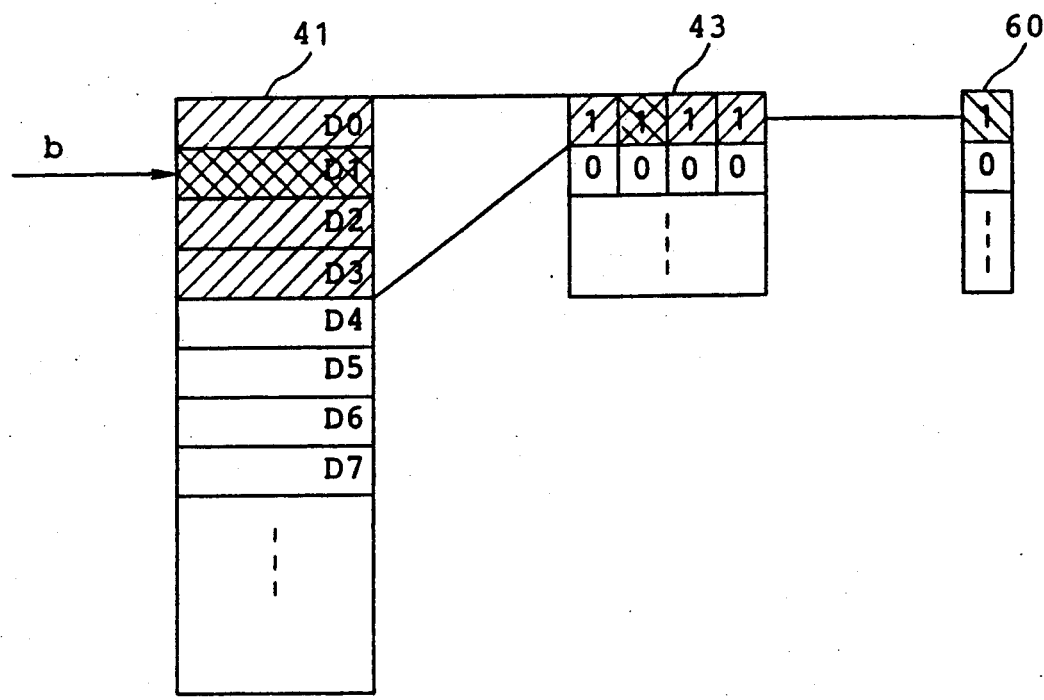
FIG. 5 shows a similar block diagram for use in describing still another operation in the buffer memory device illustrated in FIG. 2.

Referring to FIG. 5, let an operand data block be previously memorized in the first cache area of the data buffer 41, like in FIG. 3. Under the circumstances, it is assumed that a required instruction fetch request is issued from the central processing unit 10 (FIG. 10) in the form of an instruction access signal (depicted at b like in FIG. 4) which indicates the first cache area of the data buffer 41. In this event, the comparator unit 63 detects incoincidence between the block information signals sent from the first register 26 and the block information storage 60 to supply the AND gate circuit 55 with the incoincidence signal of the logic "0" level. This shows that a required instruction data block is not present in the data buffer 41. Therefore, the required instruction data block should be read out of the main memory 11 (FIG. 1).

For this purpose, block data transfer of the instruction data block in question is carried out between the main memory 11 and the buffer memory device 12 through the block data line 17 (FIGS. 1 and 2) in the manner mentioned before. During block data transfer of an instruction data block a leading one of the cache areas for the required instruction data block is kept in the second register 27 of the data processor 21 (FIG. 2). The required instruction data block is written into the leading cache area and is thereafter continuously written into three consecutive cache areas following the leading cache area. Thus, two least significant bits of the address signal kept in the second register 27 may be neglected during such a write-in operation. In the example being illustrated in FIG. 5, the zeroth cache area is indicated as the leading cache area. Therefore, the required instruction data block is loaded with the zeroth through third cache areas D1 to D3, as shown in FIG. 5. During the write-in operation, the four columns of the zeroth row in the validity information signal buffer 43 are concurrently loaded with the validity information signals of the logic "1" levels, as illustrated in FIG. 5, while the zeroth storage address of the block information storage 60 is loaded with the block information signal of the logic "1" level to indicate storage of the instruction data block. In this case, the first significant part kept in the address register 27 is simultaneously written into the zeroth through third address buffer areas A0 to A3 through the first internal address line 33. Such a simultaneous write-in operation can be carried out in a known manner and will not be described any longer.

Figure 6:
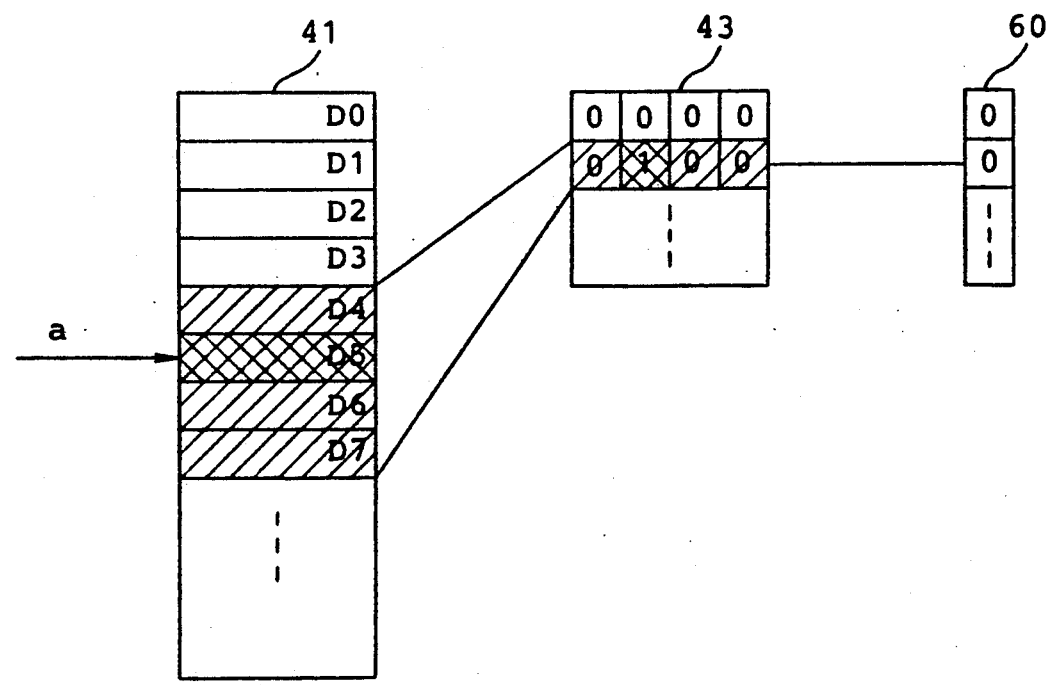
FIG. 6 shows a similar block diagram for use in describing a further operation in the buffer memory device illustrated in FIG. 2.

Referring to FIG. 6 in addition to FIG. 2, it is assumed that the fourth through seventh cache areas of the data buffer 41 are loaded with a previous instruction data block and that the four columns of the first row of the validity information signal buffer 43 are loaded with the validity information signals of the logic "1" levels, respectively. In this connection, the first storage address of the block information storage 60 is previously loaded with the logic "1" level so as to indicate storage of the previous instruction data block in the fourth through seventh cache areas D4 to D7 of the data buffer 41. Under the circumstances, let an operand fetch request be issued from the central processing unit 10 to the buffer memory device 12 to access the fifth cache area D5 in the form of an operand access signal (depicted at a in FIG. 6) by indicating an operand data block which may be called a required operand data block. Like in FIG. 5, an incoincidence signal is sent from the comparator unit 63 to the AND gate circuit 55 to indicate absence of the required operand data block.

In this case, the required operand data block is transferred from the main memory 11 to the fifth cache area D5 of the data buffer 41, as shown by a cross-hatched portion in FIG. 6. Moreover, the validity information signals of the logic "1" levels in the first row of the validity information signal buffer 43 should be rewritten, as illustrated in a cross-hatched portion of the validity information signal buffer 43, together with the first storage address of the block information storage 60.

Referring back to FIG. 2, the invalidation processor 53 is used to rewrite validity information signals memorized in the validity information signal buffer 43. More specifically, the invalidation processor 53 is supplied with the block information signal and the first significant part of the operand fetch request from the block information storage 60 and the data processor 21, respectively. The invalidation processor 53 delivers an invalidation signal to the validity information signal buffer 43. The invalidation signal is stored in three columns of the first row in the validity information signal buffer 43 under control of the data processor, as shown in FIG. 6. Thus, the validity information signals of the first row are rewritten into (0100). The first storage address of the block information storage is loaded with the logic "0" level to indicate storage of an operand data block in response to the operand fetch request.

In the illustrated example, the data buffer 41 can be loaded with both the operand and the instruction data blocks having different data block sizes in common. In addition, both the operand and the instruction data blocks can be independently processed in such a common data buffer 41. With this structure, it is possible to reduce a memory capacity of the buffer memory 41 and to effectively use the buffer memory 41 without using a data block size common to both the operand and the instruction data blocks.

While this invention has thus far been described in conjunction with a preferred embodiment thereof, it will readily be possible for those skilled in the art to put this invention into practice in various other manners. For example, a plurality of cache memories similar in structure and operation to that illustrated in FIG. 2 are arranged in different levels. The instruction data block size may not always be equal to $2^n$ times the operand data block size.

What is claimed is:

1. In a buffer memory device intermediate between a central processing unit and a main memory and operable to selectively memorize and read out an operand data block and an instruction data block in response to an operand request and an instruction request issued from said data processing unit, respectively, said buffer memory device comprising a cache memory having a plurality of cache areas each of which has a predetermined area size, the improvement wherein:

said operand data block has an operand block size of said predetermined area size while said instruction data block has an instruction block size equal to N times said operand block size where N is an integer greater than unity;

said buffer memory device comprising:

producing means responsive to each of said operand and said instruction requests for producing an area address signal to access a single one and a plurality of the cache areas at said operand block size and at said instruction block size in response to said operand and said instruction requests, respectively, said area address signal being delivered to said cache memory; and cache memory monitoring means coupled to said producing means and said cache memory for monitoring said cache memory with reference to said area address signal.

2. A buffer memory device as claimed in claim 1, the cache areas of said cache memory being loaded with said operand and said instruction data blocks, wherein said cache memory monitoring means comprises:

block information storage means coupled to said producing means for storing a block information signal representative of which one of said operand and said instruction data blocks is stored in each of said cache areas to produce a stored block information signal in response to said area address signal; and detecting means responsive to said area address signal for detecting whether said stored block information signal is representative of said operand or said instruction data block to monitor said cache memory.

3. A buffer memory device as claimed in claim 1, each of said operand and said instruction requests including a memory address signal which comprises a first significant part and a second significant part operable as said area address signal for specifying said cache areas, wherein said cache memory comprises:

data buffer means which has said plurality of the cache areas and which is accessible by said area address signal from said producing means, said data buffer means being for memorizing said operand and said instruction data blocks in said cache areas as memorized blocks with said operand data block occupying said single one of the cache areas and with each of said instruction data blocks occupying said plurality of the cache areas;

address buffer means which has a plurality of address buffer areas equal in number to said cache areas and which is accessible by said area address signal for memorizing the first significant part of each of said memorized blocks; and validity information signal memorizing means for memorizing validity signals which are in one-to-one correspondence to said cache areas and which are indicative of whether or not said cache areas are loaded with valid ones of said memorized blocks in said cache areas.

4. A buffer memory device as claimed in claim 3, wherein said monitoring means further comprises:

invalidation means coupled to said block information storage means, said validity information signal memorizing means, and said producing means for invalidating at least one of said validity signals in response to said operand request when the instruction data block specified by said area address signal is rewritten into an additional one of said operand data blocks.

5. In a buffer memory device intermediate between a central processing unit and a main memory and operable to selectively memorize and read out an operand data block and an instruction data block in response to an operand request and an instruction request issued from said data processing unit, respectively, said buffer memory device comprising a cache memory having a plurality of cache areas each of which has a predetermined area size, the improvement wherein:

said operand data block has an operand block size of said predetermined area size while said instruction data block has an instruction block size equal to N times said operand block size where N is an integer greater than unity;

said buffer memory device comprising:

producing means responsive to each of said operand and said instruction requests for producing an area address to access said cache memory at said operand block size and at said instruction block size when said set of at least one cache area address is produced in response to said operand and said instruction requests, respectively; and cache memory monitoring means coupled to said producing means and said cache memory for monitoring said cache memory with reference to the set of said cache area addresses.

* * * * *